US012771105B2

(12) United States Patent
Beristany et al.

(10) Patent No.: US 12,771,105 B2
(45) Date of Patent: Oct. 20, 2026

(54) POWER POST ASSEMBLY WITH REMOVABLE RECEPTACLE HOUSING

(71) Applicant: Hubbell Incorporated, Shelton, CT (US)

(72) Inventors: Victor Beristany, South Bend, IN (US); Krzysztof Korcz, Granger, IN (US); Krishna Patel, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 198 days.

(21) Appl. No.: 18/519,774

(22) Filed: Nov. 27, 2023

(65) Prior Publication Data

US 2024/0178642 A1 May 30, 2024

Related U.S. Application Data

(60) Provisional application No. 63/428,541, filed on Nov. 29, 2022.

(51) Int. Cl.
*H02G 3/08* (2006.01)
*H01R 13/73* (2006.01)

(52) U.S. Cl.
CPC ............. *H02G 3/081* (2013.01); *H01R 13/73* (2013.01)

(58) Field of Classification Search
CPC ... H02B 1/28; H02B 1/50; H02B 1/26; H02B 1/46; H02B 1/48; H02G 3/08; H02G 3/081; H02G 3/088; H02G 3/185
USPC ..................... 174/50, 53, 57, 58, 66, 67, 38; 220/3.2–3.8, 4.02; 248/906, 156, 536, 248/545, 87, 85, 542; 362/431, 382; 361/622, 641
See application file for complete search history.

(56) References Cited

U.S. PATENT DOCUMENTS 5,196,783 A 3/1993 Howell
6,585,221 B1 7/2003 Gretz
6,667,437 B2 * 12/2003 Schenk .................... H02G 9/10 174/38
6,742,748 B1 * 6/2004 Gretz .................... E04H 12/003 248/156
6,752,362 B1 * 6/2004 Gretz .................... F21V 21/116 248/156
6,779,764 B1 * 8/2004 Gretz ...................... F21V 21/10 248/156
6,863,251 B1 3/2005 Gretz
7,025,311 B1 * 4/2006 Gretz .................. E04H 12/2215 248/156
7,036,960 B1 * 5/2006 Gretz ...................... F21V 11/02 362/279

(Continued)

OTHER PUBLICATIONS

International Search Report and Written Opinion issued on Apr. 3, 2024, by the International Searching Authority in corresponding International Patent Application No. PCT/US2023/081126. (20 pages).

*Primary Examiner* — Angel R Estrada
(74) *Attorney, Agent, or Firm* — Robinson + Cole LLP

(57) ABSTRACT

An outdoor mounting assembly for an electrical device includes a post having a hollow body with an upper end and a lower end. A receptacle housing is removably connected to the upper end of the post. The receptacle housing has a top and a plurality of side walls defining an interior cavity. At least one of the side walls has an opening. A receptacle mounting structure is positioned in the receptacle housing and accessible through the opening.

20 Claims, 5 Drawing Sheets

(56) References Cited

U.S. PATENT DOCUMENTS

| | | | | |
|---|---|---|---|---|
| 7,193,151 | B2 * | 3/2007 | Harwood | H02G 9/10 174/37 |
| 7,361,832 | B2 * | 4/2008 | Dively | H02G 3/0493 174/37 |
| 8,089,747 | B2 * | 1/2012 | Storck | H02G 3/0493 174/59 |
| 9,768,592 | B2 * | 9/2017 | Unger | H02B 1/48 |
| 2008/0253062 | A1 | 10/2008 | Seff et al. | |
| 2010/0051310 | A1 * | 3/2010 | Wurzer | H02G 3/0493 174/59 |
| 2023/0238788 | A1 | 7/2023 | Saline | |
| 2025/0192468 | A1 * | 6/2025 | Boener | H02G 3/0493 |

* cited by examiner

POWER POST ASSEMBLY WITH REMOVABLE RECEPTACLE HOUSING

RELATED APPLICATION(S)

This application is based on U.S. Provisional Application Ser. No. 63/428,541, filed Nov. 29, 2022 the disclosure of which is incorporated herein by reference in its entirety and to which priority is claimed.

FIELD

Various exemplary embodiments relate to mounting posts for external electrical devices, for example receptacle bollards or mounting posts used in landscapes, parking lots, docks, or other outdoor areas.

BACKGROUND

Outdoor power receptacles can be used to provide temporary or semi-permanent power supply in outdoor locations. These outdoor receptacles can be elevated using bollards or mounting posts fixed at a given location. Power conductors can be run underground into the post and connected to the rear of the receptacle. The posts can provide a weather-proof housing for the receptacles.

SUMMARY

In certain configurations, an outdoor mounting assembly for an electrical device includes a post having a hollow body with an upper end and a lower end. A receptacle housing is removably connected to the upper end of the post. The receptacle housing has a top and a plurality of side walls defining an interior cavity. At least one of the side walls has an opening. A receptacle mounting structure is positioned in the receptacle housing and accessible through the opening.

In certain configurations, an outdoor mounting assembly for an electrical device includes a post having a hollow body with an upper end and a lower end. A receptacle housing is removably connected to the upper end of the post. The receptacle housing has a top and a plurality of side walls defining an interior cavity. At least one of the side walls has an opening providing access to a mounting tab positioned in the interior cavity. The mounting tab is configured to receive an electrical receptacle.

In certain configurations, an outdoor mounting assembly for an electrical device includes a post having a hollow body with an upper end and a lower end. A receptacle housing is removably connected to the upper end of the post. The receptacle housing has a top and a plurality of side walls defining an interior cavity. At least one of the side walls has an opening. A receptacle mounting structure is positioned in the receptacle housing and accessible through the opening. A fastener secures the receptacle housing to the post.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Certain aspects described herein are directed to a power post with a removable receptacle housing. Power posts are typically installed in outdoor areas and provide a weather resistant housing to a power receptacle. A two-piece assembly utilizing a separate, removable receptacle housing allows different types of receptacle housing to be attached to the post and also can allow for easy replacement of a damaged receptacle housing without having to remove the entire post. This configuration can also allow housings for other electrical devices to be connected to the post as needed. A receptacle mounting structure is positioned in the housing to receive a receptacle such as an electrical outlet. The post and receptacle housing can be made from a durable polymer material, such as PVC.

Figure 1:
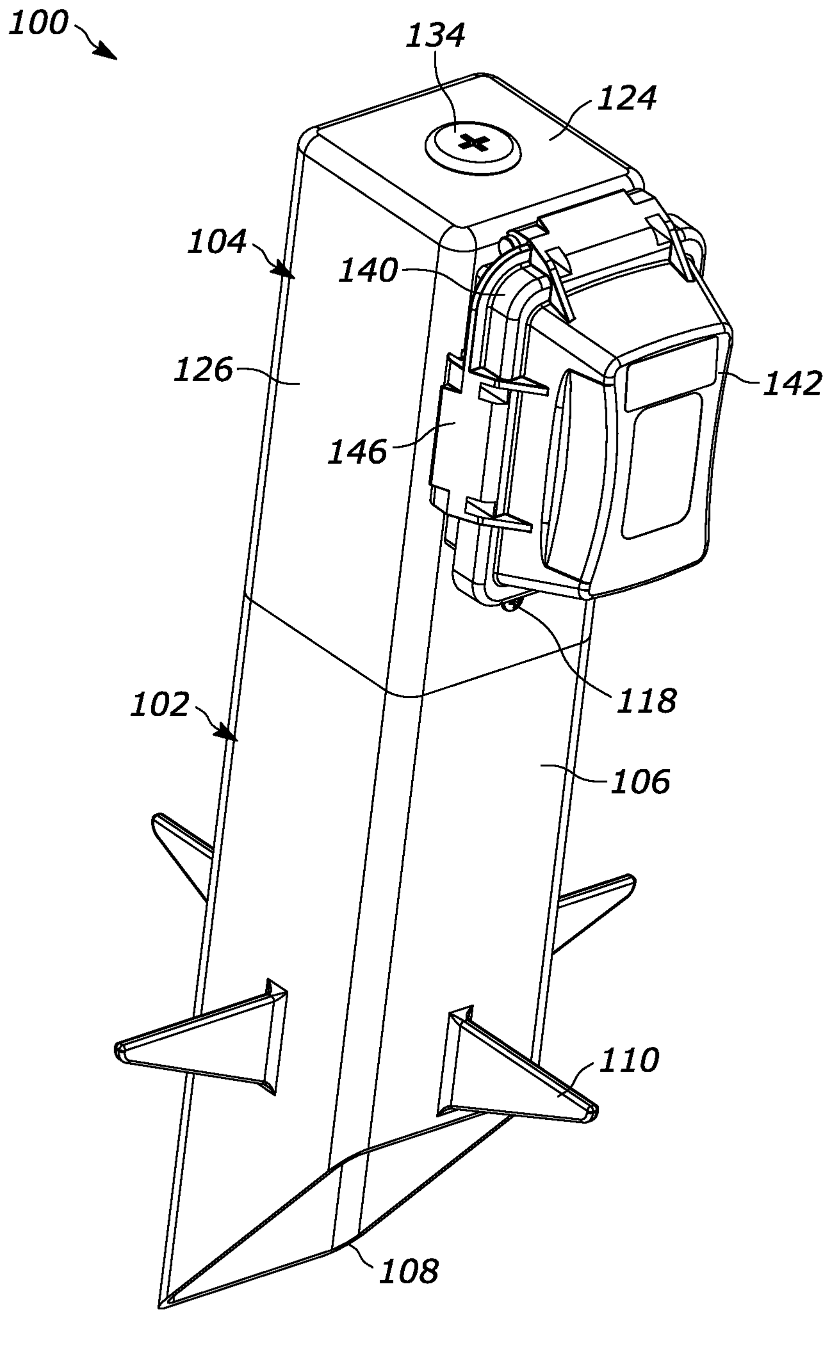
FIG. 1 is a perspective view of a power post having a ground insertion post and a receptacle housing with an integral cover.
Figure 2:
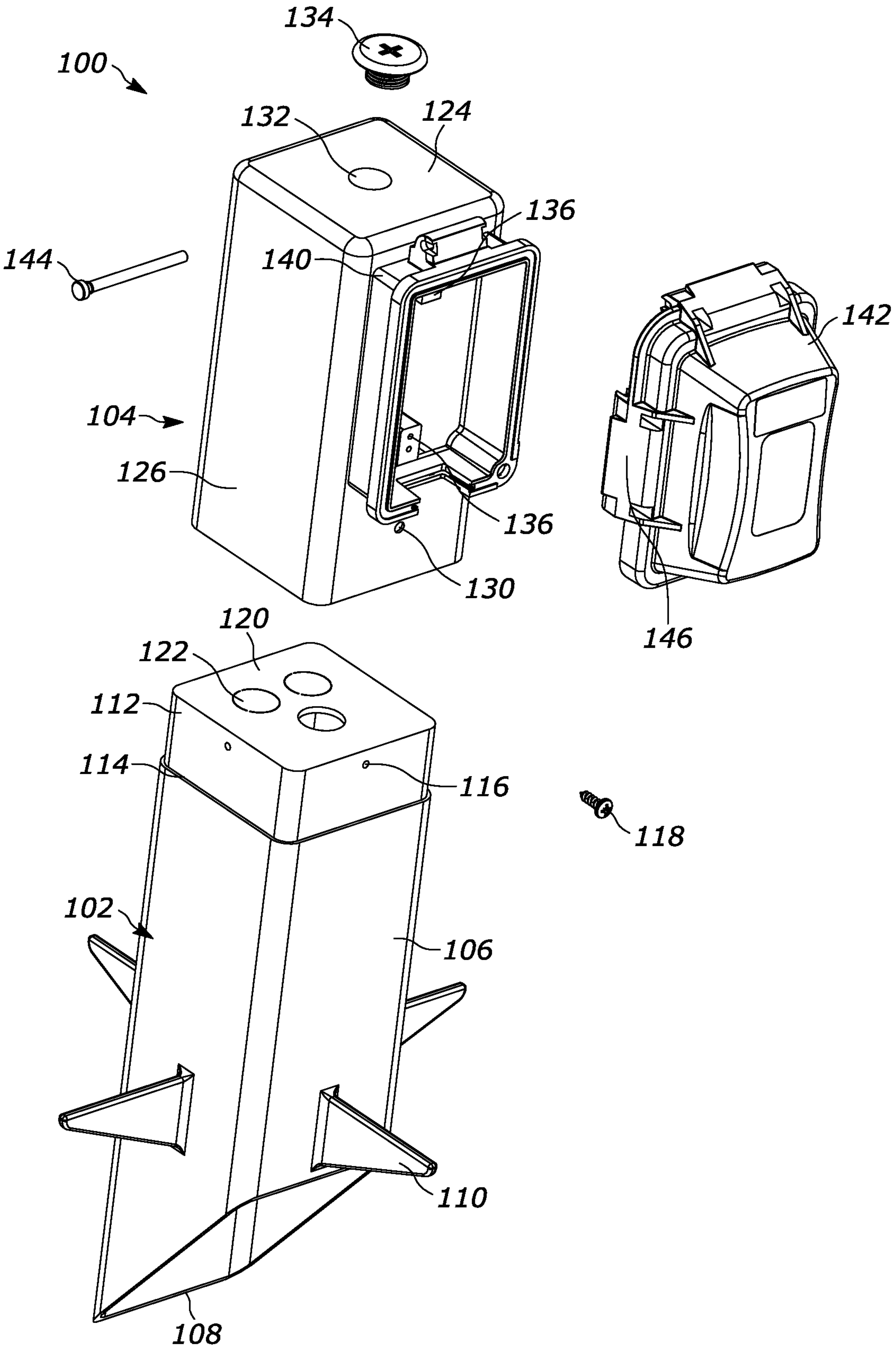
FIG. 2 is an exploded view of FIG. 1.
Figure 3:
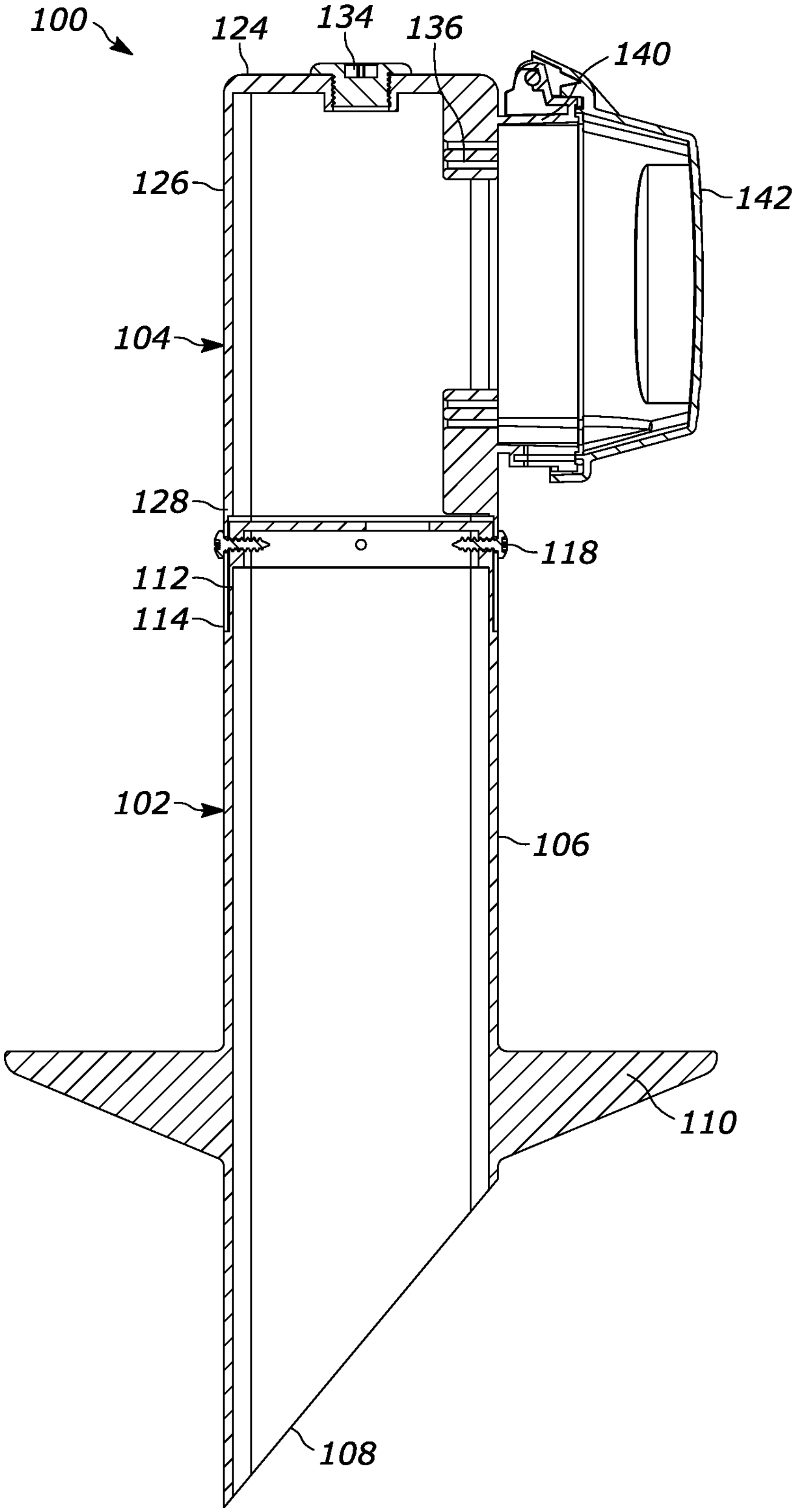
FIG. 3 is a sectional view of FIG. 1.

FIGS. 1-3 show an exemplary configuration of a power post assembly 100 for an electrical device. The illustrated embodiments depict a mounting post 102 and a removable receptacle housing 104 connected to the mounting post 102. Other configurations can utilize different housings or different electrical devices, such as light fixtures, connected to the mounting post 102.

In certain configurations the post 102 is a ground-insertion post having a substantially hollow body 106 with a square shape having a lower end and an upper end. The lower end can have a truncated portion 108 that tapers to a point to help facilitate insertion of the post 102 into the ground. One or more stabilizer fins 110 can extend outwardly from the lower end. The stabilizer fins 110 can have a substantially triangular configuration. In other configurations different types of ground stabilizers can be used instead of, or in addition to, the stabilizer fins, or no stabilizers can be used. The fins 110 may be integrally connected to the body 106 (e.g., via molding, welding, etc.). In other examples, the fins 110 may be removably connected through an opening in the body 106 (e.g., via a snap fit, press fit, etc.). In still other examples, the fins 110 may be separate elements that are connected to one another around the body 106.

The upper end of the post 102 can include a housing receiving area defined by one or more outer walls 112 offset from the lower body 106. An edge 114 is formed between the lower body 106 and the upper end. The receptacle housing 104 can be received on the edge 114 so that an outer surface of the receptacle housing 104 is substantially flush with an outer surface of the lower body 106. The outer walls 112 can include one or more openings 116 configured to receive a fastener 118 to connect the receptacle housing 104. The outer walls 112 of the housing receiving area can also have an increased thickness relative to the lower body to provide enhanced support for the housing and greater durability as best shown in FIG. 3. An upper surface 120 of the post 102 can include one or more knockouts 122 which can be removed to provide apertures through the upper end of the post 102. These apertures can be used for running conductors to make electrical connections in the receptacle housing 104.

In certain configurations, the receptacle housing 104 includes a top end 124, a plurality of side walls 126 which define an interior cavity and an open bottom. The open bottom allows the receptacle housing 104 to be slidably engaged with the post 102. A lip 128 can be formed on the inside of the side walls 126 (as best shown in FIG. 3) which engages and rests on the edge 114 of the post 102 housing receiving area. The side walls 126 can also include one or more openings 130 configured to receive a fastener 118. After being connected to the post 102, a fastener 118 can be inserted into one or more openings 116, 130 so that the fastener extends through the receptacle housing 104 and engages the post 102. The illustrated embodiments depict threaded fasteners, but other fasteners (rivets, snap-fit, etc.) may also be used.

The top end 124 can include an aperture 132 which receives a removable cap 134. The cap 134 can be threadably connected to the aperture 132. The cap 134 can be removed to allow for conductors to be run through the top of the receptacle housing 104 or to permit attachment of an accessory such as a lighting device.

One or more mounting tabs 136 can extend into the interior of the receptacle housing 104. As best shown in FIG. 2, an upper mounting tab 136 and a lower mounting tab 136 can be provided. Each of the mounting tabs 136 can include one or more apertures. The mounting tabs 136 are configured to facilitate the connection of different types of receptacles in the receptacle housing 104. For example, the apertures in the mounting tabs 136 can align with standard apertures in a mounting strap for an electrical receptacle.

In certain configurations, the receptacle housing 104 can include a base 140 formed integrally with one of the side walls 126. A cover 142 can be removably connected to the base 140. The cover 142 can be connected by a pin 144 that allows for pivoting movement of the cover 142 relative to the base 140. In the illustrated example, the pin 144 connects the cover 142 to the base 140 proximate to the top end 124. In other examples, the pin 144 can connect the cover 142 to the base 140 proximate to one of the side walls 126. Changing where the cover 142 and the base 140 are connected can change the pivoting direction of the cover 142 relative to the base 140. In certain configurations, the cover 142 can be a waterproof cover and can also be an in-use cover that allows the cover 142 to be closed while one or more plugs are connected to a receptacle. A latch 146 can be provided to secure the cover 142 in a closed position. In some configurations the cover 142 can also be connected in a vertical or horizontal orientation. Different types of receptacle covers can be used as desired.

Figure 4:
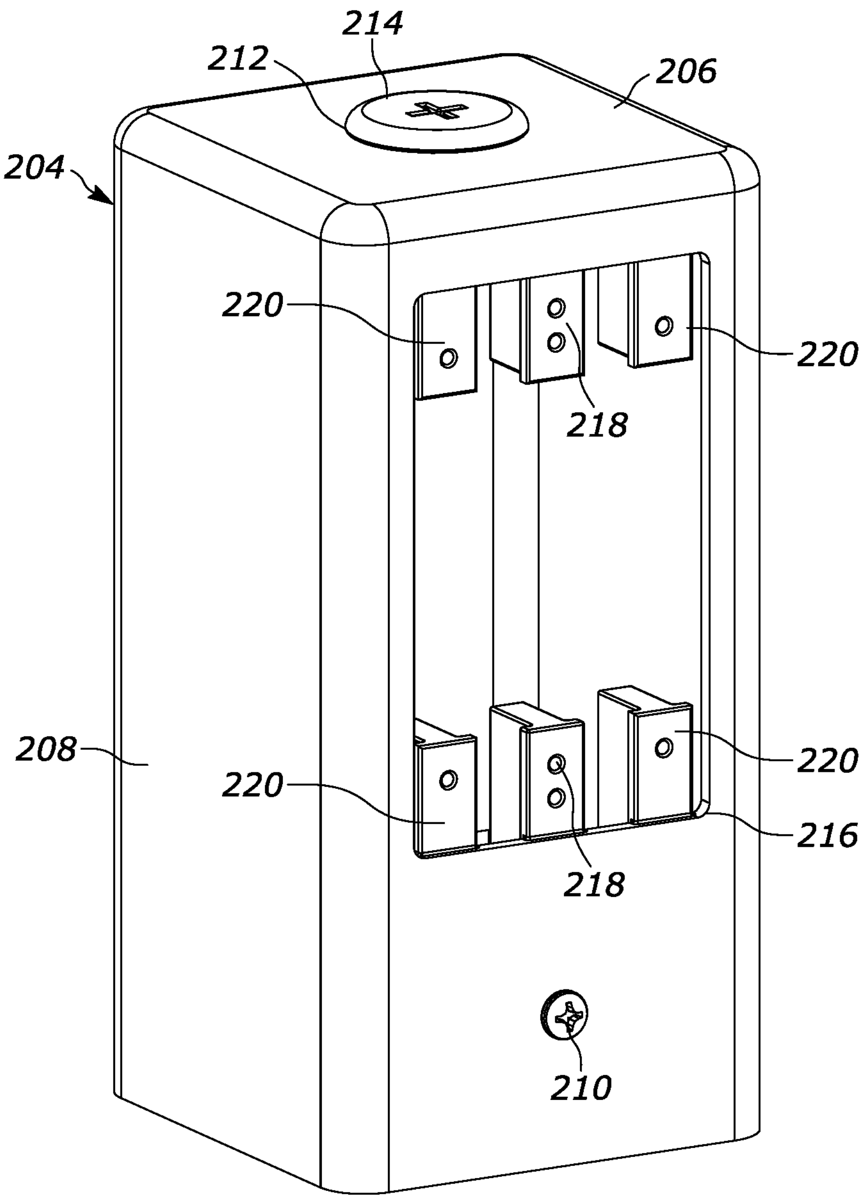
FIG. 4 is a perspective view of an open receptacle housing.

FIG. 4 shows a configuration of a receptacle housing 204 having a top end 206, a plurality of side walls 208 which define an interior cavity and an open bottom. The open bottom allows the receptacle housing 204 to be slidably engaged with the post 102. A lip can be formed on the inside of the side walls 208 (similar to what is shown in FIG. 3) which engages and rests on the edge 114 of the housing receiving area. The side walls 208 can also include one or more openings 210 configured to receive a fastener. After being connected to the post 102, a fastener can be inserted into one or more openings 210 so that the fastener extends through the receptacle housing 204 and engages the post 102. The illustrated embodiments depict threaded fasteners, but other fasteners (rivets, snap-fit, etc.) may also be used.

The top end 206 can include an aperture 212 which receives a removable cap 214. The cap 214 can be threadably connected to the aperture 212. The cap 214 can be removed to allow for conductors to be run through the top of the receptacle housing or to permit attachment of an accessory such as a lighting device.

An opening 216 is formed in one of the side walls 208 and provides access to one or mounting tabs positioned in the interior cavity. The illustrated configuration shows a set of central mounting tabs 218 and two sets of outer mounting tabs 220 positioned on either side of central mounting tabs 218. Each of the mounting tabs 218, 220 can include one or more apertures. The outer mounting tabs 220 can be configured to facilitate the connection of different types of receptacle covers. The central mounting tabs 218 are configured to facilitate the connection of different types of receptacles in the receptacle housing. For example, the apertures in the central mounting tabs 218 can align with standard apertures in a mounting strap for an electrical receptacle.

Figure 5:
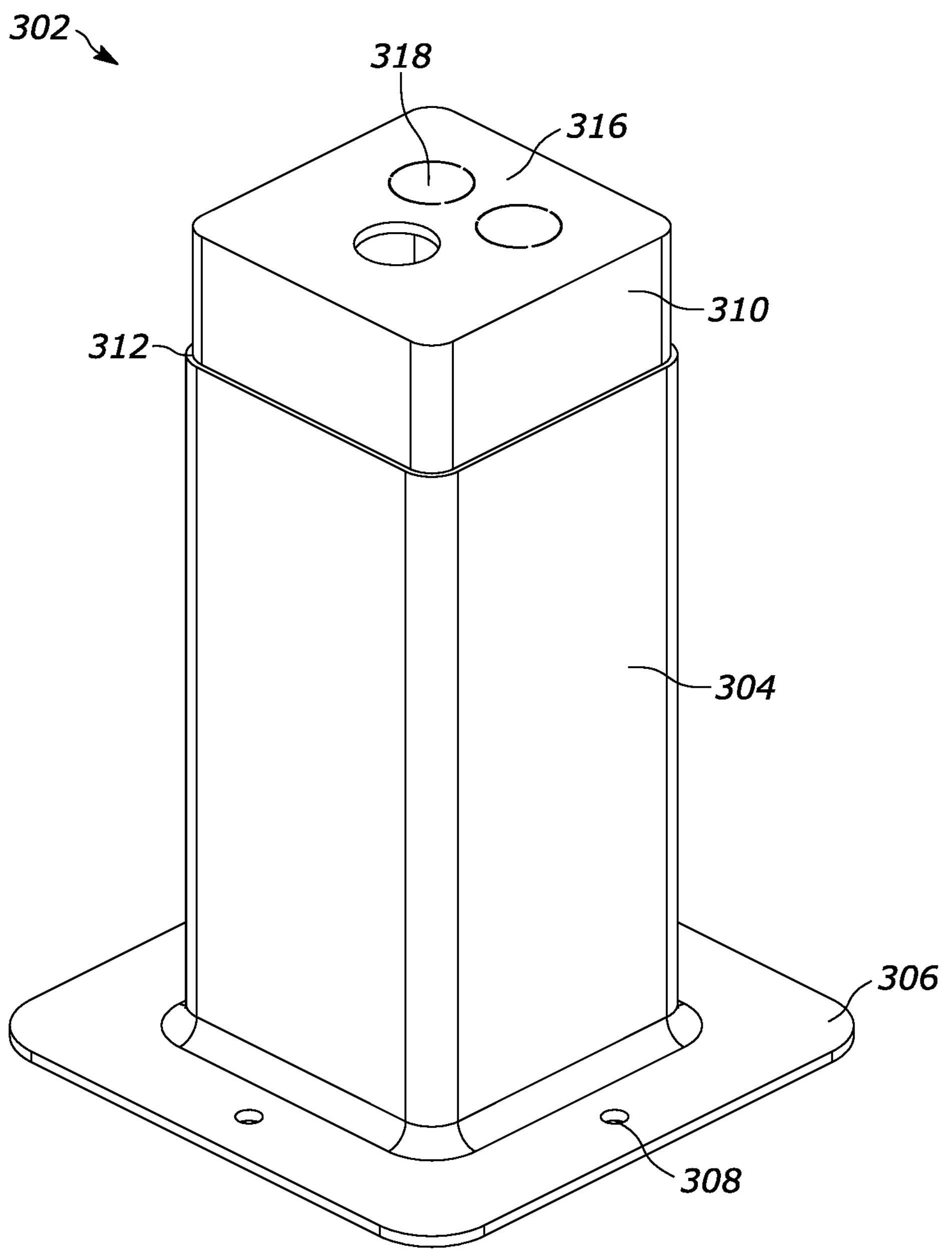
FIG. 5 is a perspective view of a surface mount post.

In certain configurations, the post can be a surface mount post 302 as shown in FIG. 5. The surface mount post 302 can include a substantially hollow body 304 with a square shape having a lower end and an upper end. A flange 306 can extend from the lower end to support and balance the post 302. One or more apertures 308 can be provided in the flange 306 to receive fasteners for securing the post 302 to a surface in a given location. For example, one or more bolts, rivets, or screws can be used to secure the post 302 to the ground.

The upper end of the post can include a housing receiving area defined by one or more outer walls 310 offset from the lower body 304. An edge 312 is formed between the lower body 304 and the upper end. The receptacle housing 104, 204 can be received on the edge 312 so that an outer surface of the receptacle housing 104, 204 is substantially flush with an outer surface of the lower body 304. The outer walls 310 can include one or more openings configured to receive a fastener to connect the receptacle housing 104, 204. The outer walls 310 of the housing receiving area can also have an increased thickness relative to the lower body 304 to provide enhanced support for the housing and greater durability. An upper surface 316 of the post 302 can include one or more knockouts 318 which can be removed to provide apertures through the upper end of the post 302. These apertures can be used for running conductors to make electrical connections in the receptacle housings.

The surface mounting post 302 can be used with the receptacle housing with the integrated cover 104 shown in FIGS. 1-3 or the open receptacle housing 204 shown in FIG. 4.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present disclosure, and are not intended to limit the structure of the exemplary embodiments of the present disclosure to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. An outdoor mounting assembly for an electrical device comprising:
- a post having a hollow body with an upper end and a lower end, the upper end including an upper surface having one or more knockouts and including a housing receiving area defined by one or more outer walls offset from the hollow body, an edge being formed between the hollow body and the upper end, wherein the one or more outer walls of the housing receiving area have an increased thickness relative to the hollow body;
- a receptacle housing removably connected to the upper end of the post, the receptacle housing having a top and a plurality of side walls defining an interior cavity, at least one of the side walls having an opening; and
- a receptacle mounting structure positioned in the receptacle housing and accessible through the opening.

2. The outdoor mounting assembly for an electrical device of claim 1, wherein the receptacle housing includes a base positioned around the opening and a cover pivotally connected to the base.

3. The outdoor mounting assembly for an electrical device of claim 2, wherein the base is integrally formed with the receptacle housing.

4. The outdoor mounting assembly for an electrical device of claim 1, wherein the receptacle housing includes a set of outer mounting tabs configured to connect to a receptacle cover.

5. The outdoor mounting assembly for an electrical device of claim 1, wherein a stabilizer fin is connected to the lower end of the post.

6. The outdoor mounting assembly for an electrical device of claim 1, wherein the lower end of the post includes a truncated portion.

7. The outdoor mounting assembly for an electrical device of claim 1, wherein the lower end of the post includes a mounting flange.

8. The outdoor mounting assembly for an electrical device of claim 1, wherein the post includes one or more recessed outer surfaces bounded by an edge for receiving the receptacle housing.

9. The outdoor mounting assembly for an electrical device of claim 1, wherein the upper surface is integrally formed with the hollow body.

10. The outdoor mounting assembly for an electrical device of claim 1, wherein the post includes a first fastener opening and the receptacle housing includes a second fastener opening configured to align with the first fastener opening.

11. The outdoor mounting assembly for an electrical device of claim 1, wherein the receptacle mounting structure includes an upper mounting tab and a lower mounting tab.

12. An outdoor mounting assembly for an electrical device comprising:
- a post having a hollow body with an upper end and a lower end;
- a receptacle housing removably connected to the upper end of the post, the receptacle housing having a top and a plurality of side walls defining an interior cavity, at least one of the side walls having an opening with an upper edge and a lower edge;
- a first central mounting tab positioned in the receptacle housing and extending from the upper edge into the opening, wherein the first central mounting tab is configured to receive an electrical receptacle;
- a first outer mounting tab positioned in the receptacle housing and extending from the upper edge into the opening, wherein the first outer mounting tab is configured to connect to a receptacle cover;
- a second central mounting tab positioned in the receptacle housing and extending from the lower edge into the opening, wherein the second central mounting tab is configured to receive the electrical receptacle; and
- a second outer mounting tab positioned in the receptacle housing and extending from the lower edge into the opening, wherein the second outer mounting tab is configured to connect to the receptacle cover.

13. The outdoor mounting assembly for an electrical device of claim 12, wherein the receptacle housing includes a base positioned around the opening and a cover pivotally connected to the base.

14. The outdoor mounting assembly for an electrical device of claim 12, wherein the receptacle housing includes a third outer mounting tab configured to connect to the receptacle cover and a fourth outer mounting tab configured to connect to the receptacle cover.

15. The outdoor mounting assembly for an electrical device of claim 12, wherein the post includes one or more recessed outer surfaces bounded by an edge for receiving the receptacle housing.

16. The outdoor mounting assembly for an electrical device of claim 12, wherein the post includes an upper surface with one or more knockouts.

17. An outdoor mounting assembly for an electrical device comprising:
- a post having a hollow body with an upper end and a lower end and including a housing receiving area defined by one or more outer walls offset from the hollow body, an edge being formed between the hollow body and the upper end, wherein the one or more outer walls of the housing receiving area have an increased thickness relative to the hollow body;
- a receptacle housing removably connected to the upper end of the post, the receptacle housing having a top and a plurality of side walls defining an interior cavity, at least one of the side walls having an opening;
- a receptacle mounting structure positioned in the receptacle housing and accessible through the opening, wherein the receptacle mounting structure is configured to receive an electrical receptacle; and
- a receptacle cover mounting structure positioned in the receptacle housing and extending into the opening, the receptacle cover mounting structure configured to connect a receptacle cover to the receptacle housing, wherein the receptacle housing is secured to the post with a mechanical fastener extending through the receptacle housing and into the one of the one or more outer walls.

18. The outdoor mounting assembly for an electrical device of claim 17, wherein the mechanical fastener is a threaded fastener.

19. The outdoor mounting assembly for an electrical device of claim 18, wherein the post has a thickened section for receiving the threaded fastener.

20. The outdoor mounting assembly for an electrical device of claim 17, wherein the receptacle mounting structure includes an upper mounting tab and a lower mounting tab.

* * * * *